(12) United States Patent
Lin

(10) Patent No.: US 7,277,377 B2
(45) Date of Patent: Oct. 2, 2007

(54) OPTICAL PICK-UP DEVICE WITH A POLARIZED LIGHT BEAM CONVERTER

(75) Inventor: Jyh-Chain Lin, Tu-Chen (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 587 days.

(21) Appl. No.: 10/822,180

(22) Filed: Apr. 9, 2004

(65) Prior Publication Data
US 2004/0202089 A1    Oct. 14, 2004

(30) Foreign Application Priority Data
Apr. 9, 2003  (TW) ............................. 92108170 A

(51) Int. Cl.
*G11B 7/135*    (2006.01)
*G02B 5/30*    (2006.01)
(52) U.S. Cl. ................... 369/112.18; 359/495
(58) Field of Classification Search ..............
369/112.16–112.21, 110.02, 110.04
See application file for complete search history.

(56) References Cited
U.S. PATENT DOCUMENTS 5,657,306 A    8/1997   Komatsu
5,708,644 A *  1/1998   Hasegawa ............. 369/112.19
5,748,602 A    5/1998   Chao et al.
6,348,997 B1 * 2/2002   Itoh ........................... 359/495
6,542,298 B1 * 4/2003   Aoki ..................... 369/112.16

FOREIGN PATENT DOCUMENTS
CN    1182933    5/1998

\* cited by examiner

*Primary Examiner*—William Korzuch
*Assistant Examiner*—Nathan Danielsen
(74) *Attorney, Agent, or Firm*—Wei Te Chung

(57) ABSTRACT

An optical pick-up device includes a light source (2), a polarized light beam converter (4), a splitter (6), a collimating lens (7), and a photo-detector (9). A linear polarized light beam with a first type of polarized component and a second type of polarized component is emitted from the light source, and passes through the polarized light beam converter. The first type of polarized component is converted into the second type of polarized component by the polarized light beam converter. Then part of the light beam with the second type of polarized component passes through the splitter and is focused onto an optical disc (8) by the collimating lens. The optical disc reflects the light beam that contains recorded information read from the optical disc. The reflected light beam passes back through the collimating lens, is reflected by the splitter, and is received by the photo-detector.

13 Claims, 4 Drawing Sheets

OPTICAL PICK-UP DEVICE WITH A POLARIZED LIGHT BEAM CONVERTER

BACKGROUND OF THE INVENTION

1. Field of the Invention

The present invention relates to an optical information transmission system, and more particularly to an optical pick-up device for recording information to and reproducing information from an optical information storage medium.

2. Description of Prior Art

An optical pick-up device is an apparatus for recording information on an optical disc or reading out recorded information from an optical disc by using a laser light beam generated in an optical disc drive system. Generally, the optical pick-up device includes: a light source for producing the laser light beam; a light beam splitter for directing the laser light beam emitted from the light source toward an objective lens, which focuses the laser light beam onto a recording surface of an optical disc; and a photo-detector for receiving the light beam reflected by the recording surface, the reflected light beam containing information read from the recording surface.

In order to accurately record and reproduce data, it is desirable for an optical pick-up device to minimize loss of light beams passing therethrough. This improves the efficiency of utilization of the light beams, and reduces the size of light beam focusing dots impinging on the recording surface. A small dot size reduces noise and enhances the signal to noise ratio.

Generally, it is difficult to eliminate errors of recording information on an optical disc or reading out the recorded information from the optical disc due to aberration caused by spherical lenses employed in a convention optical pick-up device. Accordingly, aspheric lenses are employed in optical pick-up devices for partially eliminating the aberration. On the other hand, incident light beams can also cause aberration. Even though linear polarized light beams are employed as the incident light beams, the linear polarized light beams can be split into a P-polarized component and an S-polarized component, which can also cause aberration.

In order to overcome the above-described problems, improved optical pick-up devices such as that shown in FIG. 5 have been developed. The optical pick-up device 100 comprises a light source 110, a linear polarized light beam converter 120, a polarized light beam splitter 130, a splitter 140, an aspheric lens 150, and an optical disc 160. A light beam emitted from the light source 110, such as a semiconductor laser, passes through the linear polarized light beam converter 120 and is converted into a linear polarized light beam with a P-polarized component and an S-polarized component. Then the linear polarized light beam with the P-polarized component and the S-polarized component enters the linear polarized light beam splitter 130. Any P-polarized component of the linear polarized light beam is reflected away by the linear polarized light beam splitter 130, whereas the linear polarized light beam with the S-polarized component passes through the linear polarized light beam splitter 130 unimpeded. Then at the splitter 140, part of the linear S-polarized light beam passes through the splitter 140 unaltered, and a remaining part of the linear S-polarized light beam is reflected away by a reflecting face 142 of the splitter 140. The unaltered part of the linear S-polarized light beam is then focused onto a recording surface (not labeled) of the optical disc 160 by the aspheric lens 150. The recording surface reflects the light beam such that the reflected light beam contains recorded information read from the recording surface. The reflected light beam passes back through the aspheric lens 150, is reflected by the reflecting face 142 of the splitter 140, and is received by a photo-detector (not shown).

The optical pick-up device 100 can partially eliminate the problem of aberration. However, the linear polarized light beam with the P-polarized component is completely reflected by the linear polarized light beam splitter 130, so that almost half of the linear polarized light beam is wasted. The efficiency of utilization of light beams in the optical pick-up device 100 is correspondingly low.

SUMMARY OF THE INVENTION

Accordingly, an object of the present invention is to provide an optical pick-up device which has excellent efficiency of utilization of light beams.

In order to achieve the object set forth, an optical pick-up device in accordance with the present invention comprises a light source for emitting a linear polarized light beam with a first type of polarized component and a second type of polarized component; a polarized light beam converter for converting the first type of polarized component of the linear polarized light beam into the second type of polarized component; a splitter for partially transmitting and partially reflecting the linear polarized light beam with the second type of polarized component; a collimating lens for converging the transmitted linear polarized light beam with the second type of polarized component onto an optical disc; and a photo-detector for receiving a corresponding light beam reflected by the optical disc. Because the optical pick-up device employs the polarized light beam converter to convert the first type of polarized component of the linear polarized light beam into the second type of polarized component, almost all the linear polarized light beam emitted from the light source can be utilized. Thus, the efficiency of utilization of light beams is improved.

Other objects, advantages and novel features of the present invention will become more apparent from the following detailed description when taken in conjunction with the accompanying drawings, in which:

DETAILED DESCRIPTION OF PREFERRED EMBODIMENTS OF THE INVENTION

Figure 1:
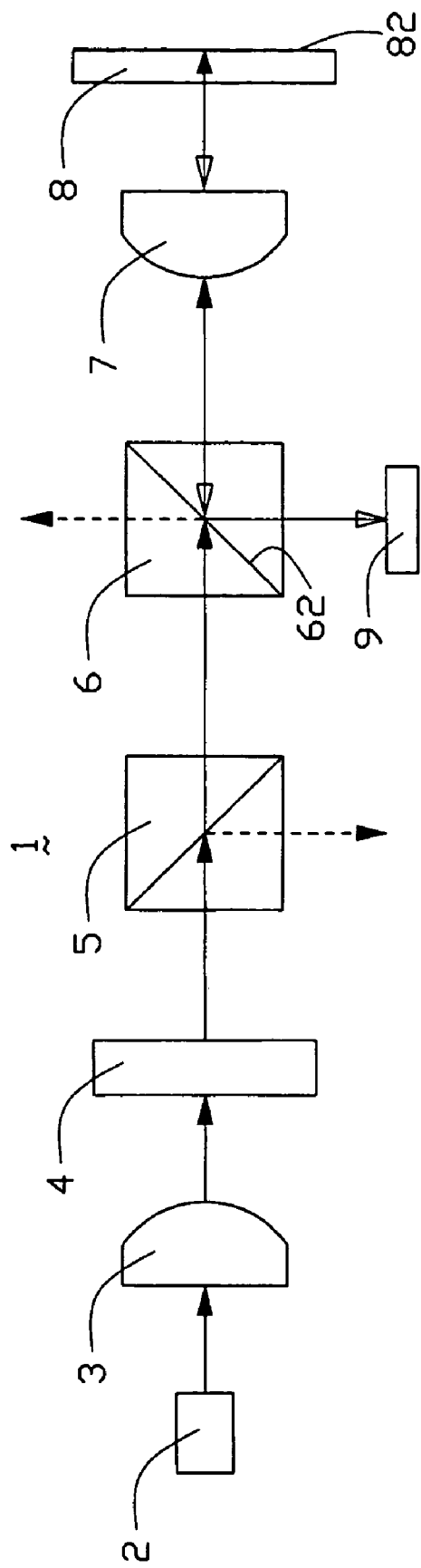
FIG. 1 is a schematic side view of an optical pick-up device according to a first embodiment of the present invention.

Referring to FIG. 1, an optical pick-up device 1 according to the first embodiment of the present invention comprises in sequence: a light source 2 emitting a linear polarized light beam with a P-polarized component and an S-polarized component; a first collimating lens 3; a polarized light beam converter 4 converting the P-polarized component of the linear polarized light beam into an S-polarized component, or converting the S-polarized component of the linear polarized light beam into a P-polarized component; a polarized light beam splitter 5; a splitter 6 comprising a reflecting face 62 for reflecting light beams; a second collimating lens 7; and a photo-detector 9. The light source can be a group of semiconductor lasers, or a laser-emitting diode. Preferably, each of the first collimating lens 3 and the second collimating lens 7 is an aspheric lens.

Figure 2:
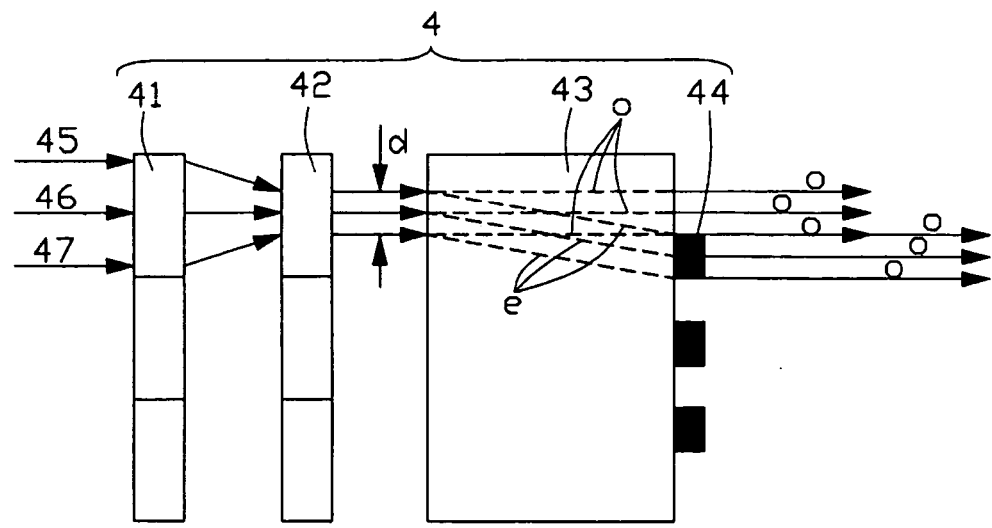
FIG. 2 is a schematic side view of one embodiment of a polarized light beam converter of the optical pick-up device of the present invention.

Referring to FIG. 2, the polarized light beam converter 4 comprises a first micro lens array 41, a birefringent crystal 43, a second micro lens array 42 set between the first micro lens array 41 and the birefringent crystal 43, and a plurality of half-wave plates 44 adjacent the birefringent crystal 43. The lenses of the first micro lens array 41 are convex lenses, and the lenses of the second micro lens array 42 are concave lenses. The lenses of the first and second micro lens arrays 41, 42 can be fabricated by micro mechanical fine fabricating technology, such as LIGA (Lithographie Gavanoformung Abformung). The lenses of the first and second micro lens arrays 41, 42 each have a diameter in the range from 10 micrometers to 300 micrometers. The birefringent crystal 43 is selected from the group consisting of yttrium vanadate crystal ($YVO_4$), lithium niobate crystal ($LiNbO_3$), and other crystals which can convert an input light beam having different polarized components into output light beams having different angles of deviation according to the different polarizations. The half-wave plates 44 are attached on a surface of the birefringent crystal 43 by epoxy resin. A distance between any two adjacent two half-wave plates 44 is equal to a height of each of the half-wave plates 44.

An exemplary of the linear polarized light beam emitted from the light source 2 is converted into parallel light rays 45, 46, 47 by the first collimating lens 3. The parallel light rays 45, 46, 47 are converged by the first micro lens array 41 and transmitted to the second micro lens array 42. A gap defined between the first micro lens array 41 and the second micro lens array 42 is smaller than a focal length of each lens of the first micro lens array 41. An overall width d of the parallel light rays 45, 46, 47 output from a corresponding lens of the second micro lens array 42 can be changed by adjusting the position of the second micro lens array 42 in order to change the gap. Thus the width d can be changed to equal the height of each of the half-wave plates 44. Each of the parallel light rays 45, 46, 47 is separated into two polarized light rays, namely an O ray and an E ray, by the birefringent crystal 43. In other words, the O ray and the E ray are respectively a P-polarized component and an S-polarized component, or respectively an S-polarized component and a P-polarized component. The O ray is an ordinary ray, and the E ray is an extraordinary ray. The O ray passes through the birefringent crystal 43 without changing direction, whereas the E ray passes through the birefringent crystal 43 with a deviation in direction. Thus the O ray passes directly out from the birefringent crystal 43 into air, whereas the E ray passes out from the birefringent crystal 43 directly into a corresponding half-wave plate 44. The half-wave plate 44 delays an optical phase of the E ray 90 degrees, thus converting the E ray into an O ray. Because the height of the half-wave plate 44 is equal to the width d of the parallel light rays 45, 46, 47 output from the second micro lens array 42, virtually all the E rays output from the birefringent crystal 43 can be converted into O rays by accurately adjusting the positions of the half-wave plates 44. Therefore, the parallel light rays 45, 46, 47 passing through the polarized light beam converter 4 can be converted into O rays.

Figure 3:
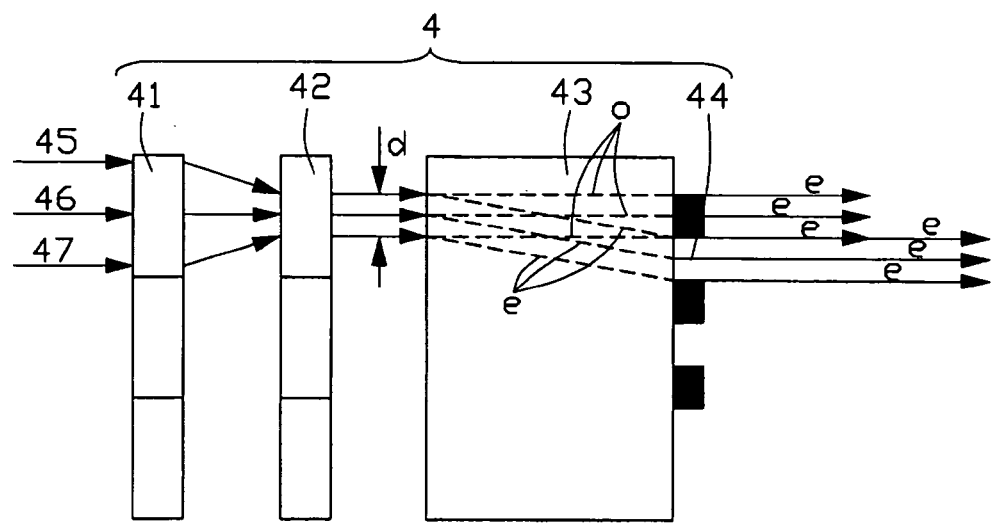
FIG. 3 is a schematic side view of another embodiment of the polarized light beam converter of the optical pick-up device of the present invention.

Referring to FIG. 3, the parallel light rays 45, 46, 47 passing through the polarized light beam converter 4 can alternatively be converted into E rays by adjusting positions of the half-wave plates 44 so that the half-wave plates 44 delay optical phases of the O rays 90 degrees. In summary, the linear polarized light beam with the P-polarized component and the S-polarized component emitted from the light source 2 can be selectably converted into either a uniform linear P-polarized light beam or a uniform linear S-polarized light beam.

Referring to FIG. 1, in operation of the optical pick-up device 1, the linear polarized light beam with the P-polarized component and the S-polarized component is emitted from the light source 2 and passes through the polarization converter 4. The P-polarized component of the linear polarized light beam is converted into an S-polarized component by the polarization converter 4. Then the linear S-polarized light beam enters the polarized light beam splitter 5. If there is any residual P-polarized component that was not converted into the S-polarized component, such P-polarized component is reflected away by the polarized light beam splitter 5. The linear S-polarized light beam passes through the polarized light beam splitter 5 unimpeded. Then part of the linear S-polarized light beam passes through the splitter 6 unaltered, and a remaining part of the linear S-polarized light beam is reflected away by the reflecting face 62 of the splitter 6. The unaltered part of the linear S-polarized light beam is then focused onto a recording surface 82 of an optical disc 8 by the second collimating lens 7. The recording surface 82 reflects the light beam such that the reflected light beam contains recorded information read from the recording surface 82. The reflected light beam passes back through the second collimating lens 7, is reflected by the reflecting face 62 of the splitter 6, and is received by the photo-detector 9.

The above-described transmission of the linear polarized light beam from the light source 2 to the photo-detector 9 may alternatively be performed by having the polarization converter 4 convert the S-polarized component of the linear polarized light beam into a P-polarized component, as described above in relation to FIGS. 2 and 3.

Figure 4:
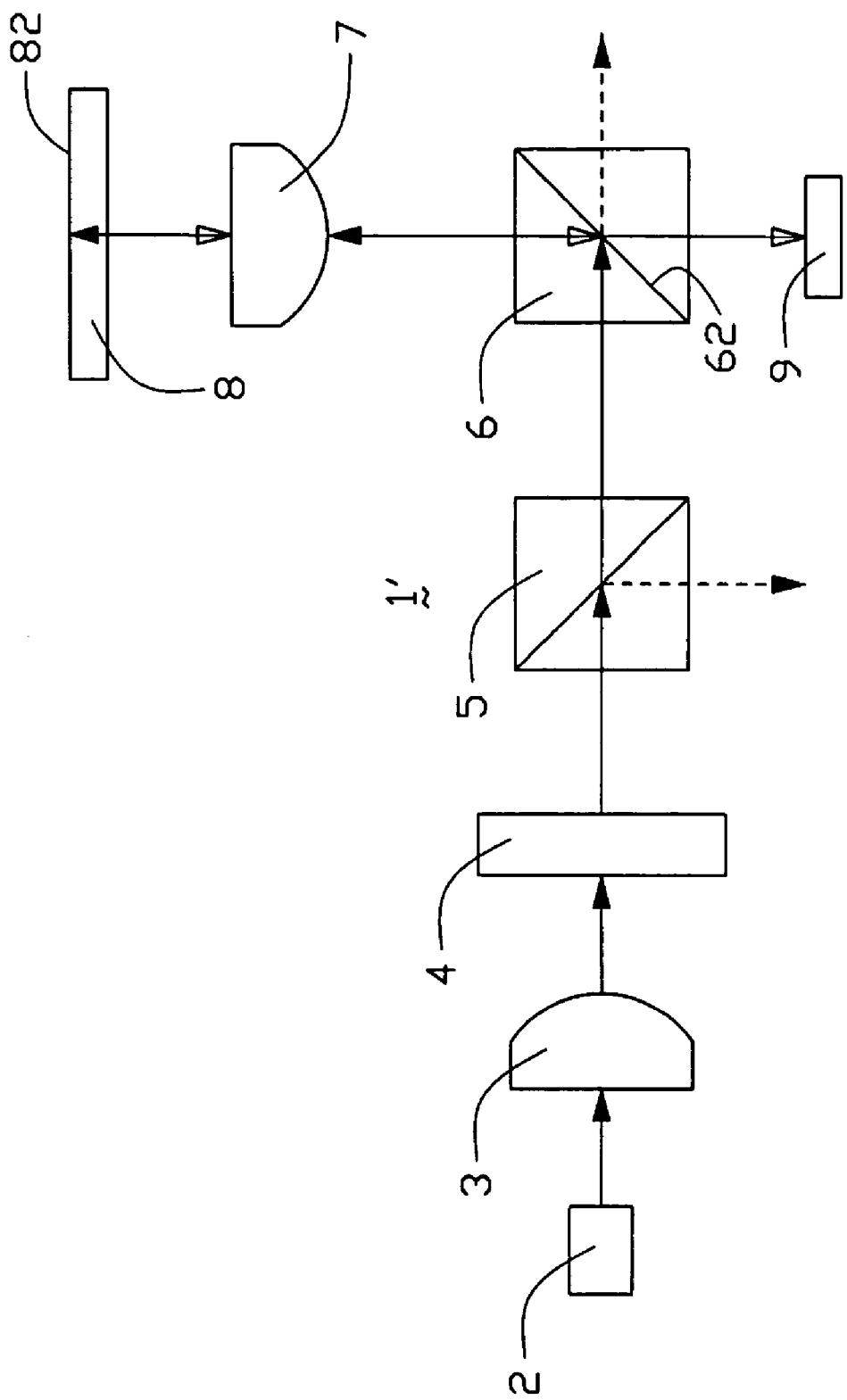
FIG. 4 is a schematic side view of an optical pick-up device according to a second embodiment of the present invention.
Figure 5:
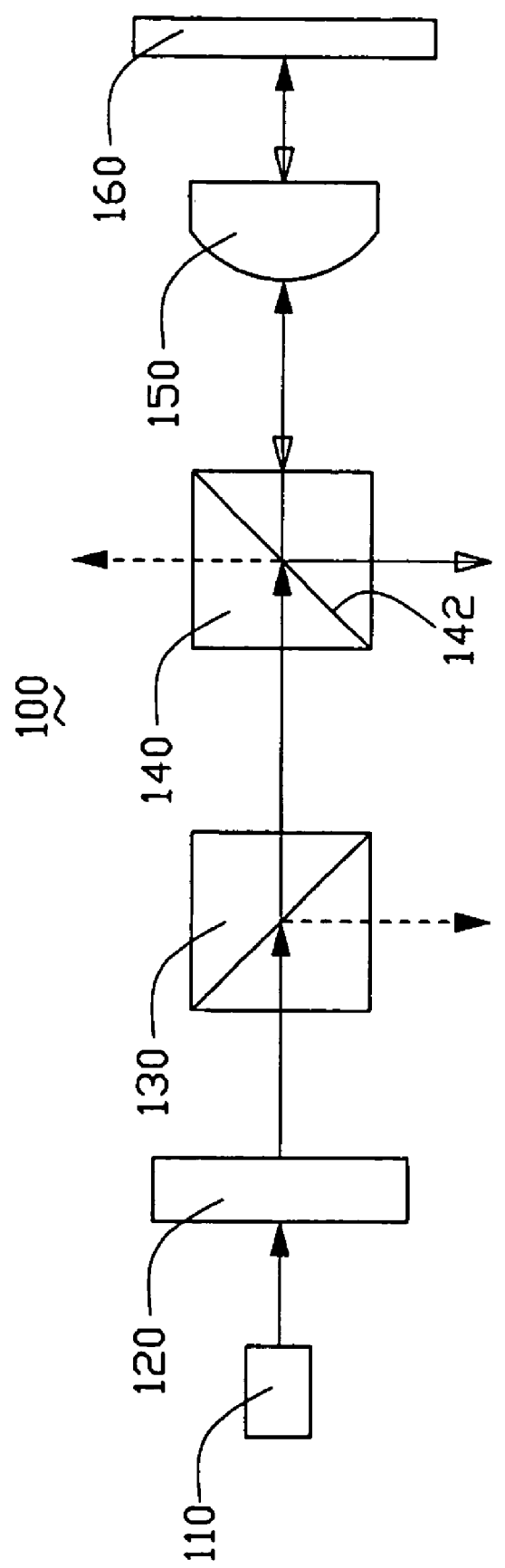
FIG. 5 is a schematic side view of a conventional optical pick-up device.

Referring to FIG. 4, in operation of an optical pick-up device 1' according to the second embodiment of the present invention, the linear polarized light beam with the P-polarized component and the S-polarized component is emitted from the light source 2 and passes through the polarization converter 4. The P-polarized component of the linear polarized light beam is converted into an S-polarized component by the polarization converter 4. Then the linear S-polarized light beam enters the polarized light beam splitter 5. If there is any residual P-polarized component that was not converted into the S-polarized component, such P-polarized component is reflected away by the polarized light beam splitter 5. The linear S-polarized light beam passes through the polarized light beam splitter 5 unimpeded. Then part of the linear S-polarized light beam is reflected by the reflecting face 62 of the splitter 6, and a remaining part of the linear S-polarized light beam passes through the splitter 6 unaltered. The reflected part of the light beam is then focused onto the recording surface 82 of the optical disc 8 by the second collimating lens 7. The recording surface 82 reflects the light beam such that the reflected light beam contains recorded information read from the recording surface 82. The reflected light beam passes back through the second collimating lens 7, passes through the splitter 6 unaltered, and is received by the photo-detector 9.

The above-described transmission of the linear polarized light beam from the light source 2 to the photo-detector 9 may alternatively be performed by having the polarization converter 4 convert the S-polarized component of the linear polarized light beam into a P-polarized component, as described above in relation to FIGS. 2 and 3.

In summary, a linear polarized light beam converter, i.e. the polarized light beam converter 4, is used in the optical pick-up device 1 of the present invention. The polarized light beam converter 4 can convert a P-polarized light component into an S-polarized light component, or convert an S-polarized light component into a P-polarized light component. Loss of light power due to the presence of both a P-polarized component and an S-polarized component can be greatly ameliorated. That is, the efficiency of utilization of light beams can be greatly improved.

It is to be understood that the invention may be embodied in other forms without departing from the spirit thereof. Thus, the present examples and embodiments are to be considered in all respects as illustrative and not restrictive, and the invention is not to be limited to the details given herein.

What is claimed is:

1. An optical pick-up device comprising:
    a light source configured for emitting a linear polarized light beam with a first type of polarized component and a second type of polarized component;
    a polarized light beam converter configured for converting the first type of polarized component of the linear polarized light beam into the second type of polarized component, the polarized light beam converter comprising a first micro lens array, a birefringent crystal, a second micro lens array located between the first micro lens array and the birefringent crystal, and a plurality of half-wave plates mounted on a surface of the birefringent crystal; each lens of the second micro lens array being a concave lens;
    a first splitter configured for partially transmitting and partially reflecting the linear polarized light beam with the second type of polarized component;
    a first collimating lens configured for converging the transmitted linear polarized light beam with the second type of polarized component onto an optical disc; and
    a photo-detector configured for receiving a corresponding light beam reflected by the optical disc.

2. The optical pick-up device in accordance with claim 1, further comprising a polarized light beam splitter located between the polarized light beam converter and the first splitter.

3. The optical pick-up device in accordance with claim 1, further comprising a second collimating lens set between the light source and the polarized light beam converter.

4. The optical pick-up device in accordance with claim 1, wherein the light source comprises a semiconductor laser.

5. The optical pick-up device in accordance with claim 1, wherein the light source comprises a light emitting diode.

6. The optical pick-up device in accordance with claim 1, wherein each lens of the first micro lens array is a convex lens.

7. The optical pick-up device in accordance with claim 1, wherein the birefringent crystal is a yttrium vanadate crystal or a lithium niobate crystal.

8. The optical pick-up device in accordance with claim 1, wherein the half-wave plates are attached on the surface of the birefringent crystal by epoxy resin.

9. The optical pick-up device in accordance with claim 1, wherein the first splitter comprises a reflecting face configured for partially reflecting the linear polarized light beam with the second type of polarized component.

10. The optical pick-up device in accordance with claim 1, wherein the first collimating lens is an aspheric lens.

11. The optical pick-up device in accordance with claim 1, wherein a distance between any two adjacent half-wave plates is equal to a height of each half wave plate, and the height of each half-wave plate is equal with a width of light rays output from a corresponding lens of the second micro lens array.

12. An optical pick-up device comprising:
    a light source configured for emitting a linear polarized light beam having a first kind of polarized component and a second kind of polarized component;
    a polarized light beam converter configured for converting the first kind of polarized component of the linear polarized light beam into the second kind of polarized component the polarized light beam converter comprising a first micro lens array, a second micro lens array, a birefringent crystal and a plurality of half-wave plates; the birefringent crystal defining a first surface and a second surface opposite to the first surface, the first and the second micro lens arrays being located adjacent to the first surface, and the plurality of half-wave plates being located adjacent to the second surface; each lens of the first micro lens array being a converging lens; the second micro lens array being located between the first micro lens array and the birefringent crystal, and a gap defined between the first micro lens array and the second micro lens array being smaller than a focal length of each lens of the first micro lens array;
    a splitter aligned with the polarized light beam converter and configured for partially transmitting and partially reflecting the linear polarized light beam with the second kind of polarized component;
    a collimating lens configured for converging the transmitted linear polarized light beam with the second kind of polarized component onto an optical disc; and
    a photo-detector configured for receiving a corresponding light beam reflected by the optical disc.

13. The optical pick-up device in accordance with claim 12, wherein a distance between any two adjacent half-wave plates is equal to a height of each half-wave plate, and the height of each half-wave plate is equal to a width of light rays output from a corresponding lens of the second micro lens array.

* * * * *